(12) United States Patent
Bamji

(10) Patent No.: US 7,375,803 B1
(45) Date of Patent: May 20, 2008

(54) RGBZ (RED, GREEN, BLUE, Z-DEPTH) FILTER SYSTEM USABLE WITH SENSOR SYSTEMS, INCLUDING SENSOR SYSTEMS WITH SYNTHETIC MIRROR ENHANCED THREE-DIMENSIONAL IMAGING

(75) Inventor: Cyrus Bamji, Fremont, CA (US)

(73) Assignee: Canesta, Inc., Sunnyvale, CA (US)

(*) Notice: Subject to any disclaimer, the term of this patent is extended or adjusted under 35 U.S.C. 154(b) by 0 days.

(21) Appl. No.: 11/804,653

(22) Filed: May 18, 2007

Related U.S. Application Data

(60) Provisional application No. 60/801,225, filed on May 18, 2006, provisional application No. 60/801,202, filed on May 18, 2006.

(51) Int. Cl.
*G01B 3/08* (2006.01)
(52) U.S. Cl. .................................... 356/4.01
(58) Field of Classification Search ............... 356/4.01
See application file for complete search history.

(56) References Cited

U.S. PATENT DOCUMENTS

2004/0239913 A1* 12/2004 Kobayashi et al. ........ 356/4.01
2005/0207044 A1* 9/2005 Oon et al. .................. 359/885
2006/0077380 A1* 4/2006 Ohtomo et al. .......... 356/141.1

* cited by examiner

*Primary Examiner*—Thomas H. Tarcza
*Assistant Examiner*—Luke D Ratcliffe
(74) *Attorney, Agent, or Firm*—Canesta, Inc.; Michael A. Kaufman

(57) ABSTRACT

For use with an imaging system, in one aspect, the present invention implements a filter system that provides a precise narrow band pass for IR-NIR wavelengths, while also providing individual dye-type filters that can be disposed above individual RGB pixels to create dedicated red, green, and blue pixel responses. An interference dichotic filter provides a non-critical first pass band that adequately encompassed RGB wavelengths, and provides a more critical IR-NIR pass band for Z-pixels. The individual dye-type filters have individual R, G, B pass band shapes that fall within the interference filter. Preferably a dye-type NIR-IR filter is also in a common optical path with the other filters to contribute to the overall filtering. In a second aspect, the invention provides an RGB-Z system with dynamically updated image renderings to better enable a viewer of the image to acquire a sense of depth.

20 Claims, 9 Drawing Sheets

RGBZ (RED, GREEN, BLUE, Z-DEPTH) FILTER SYSTEM USABLE WITH SENSOR SYSTEMS, INCLUDING SENSOR SYSTEMS WITH SYNTHETIC MIRROR ENHANCED THREE-DIMENSIONAL IMAGING

RELATIONSHIP TO CO-PENDING APPLICATION

Priority is claimed from U.S. provisional patent application Ser. No. 60/801,202, filed on 18 May 2006, entitled RGBZ Filter System, and to U.S. provisional patent application Ser. No. 60/801,225 filed 18 May 2006, entitled Synthetic Mirror for Enhanced Three-Dimensional Imaging. Each of these provisional applications is assigned to Canesta, Inc. of Sunnyvale, Calif., assignee herein.

FIELD OF THE INVENTION

The invention relates generally to systems that acquire images including three-dimensional images to obtain distance z-data as well as color information, and more particularly to implementing relatively inexpensive mass-producible RGB-Z filters for such systems, as well as enabling enhanced three-dimensional imaging by use of a so-called synthetic mirror.

BACKGROUND OF THE INVENTION

Time-of-flight (TOF) systems that provide a measure of distance (Z) from the system to a target object without depending upon luminosity or brightness information obtained from the target object are known in the art. See for example U.S. Pat. No. 6,323,942 entitled CMOS-Compatible Three-Dimensional Image Sensor IC (2001), assigned to Canesta, Inc., now of Sunnyvale, Calif. TOF systems according to the '942 patent include a light source of relatively low power periodic optical energy typically in the near IR (NIR) range of perhaps 800 nm) and determine how long it takes until at least some of that energy reflected by a target object arrives back at the system to be detected. Detection occurs within a typically 50 µm×50 µm array of Z-pixel detectors, perhaps 100×100 pixels, as well as circuitry for processing detection charge output by the associated detector, e.g., 100×100 processing circuits. Some of emitted optical energy (e.g., from the light source) can reflect off the surface of a target object and is detected by pixels in the pixel array. The roundtrip length of time or time-of-flight (TOF) between emitted optical energy and detection of reflected optical energy is a measure of the separation distance z between the TOF system and the target object. Thus, if the roundtrip TOF time is denoted t1, then the distance between target object and the TOF system is Z1, where $Z1=t1 \cdot C/2$, and where C is velocity of light. The TOF system may also include a microprocessor or microcontroller unit with associated RAM and ROM, as well as a high speed distributable clock and various computing and input/output (I/O) circuitry. Among other functions, the controller unit can perform z-distance to target object and target object velocity calculations. TOF systems can function well to determine z-distance to a target object and can realize three-dimensional images of a target object in real time, without need for ambient light.

More sophisticated TOF approaches are exemplified by U.S. Pat. Nos. 6,515,740 (2003) and 6,580,496 (2003) respectively Methods and Systems for CMOS-Compatible Three-Dimensional Imaging Sensing Using Quantum Efficiency Modulation, assigned to Canesta, Inc., now of Sunnyvale, Calif. In these systems, TOF is determined by examining relative phase shift between transmitted light signals and light signals reflected from the target object. Detection of the reflected light signals over multiple locations in the system pixel array results in measurement signals that are referred to as depth or z-images. The depth images represent a three-dimensional image of the target object surface.

Conventional RGB systems are known in the art and can include such commonly used devices as color cameras, home video cameras, and the like. Such systems require ambient light, e.g., sunlight, to illuminate a target object. Ambient optical energy reflected by the target object falls upon an array of red-green-blue (RGB) sensitive pixels in an array. Assuming sufficient ambient light, the array of RGB pixels can, more or less, develop an image representative of what the camera is seeing.

Thus, while TOF systems acquire z-data, RGB systems essentially acquire a color or gray-scale, or black-and-white (BW), image of the target object. In some applications it is useful to simultaneously acquire both RGB and z information.

FIG. 1A depicts a generic camera or imaging system 10 that includes a preferably RGB-Z sensor 20 containing pixels responsive to optical energy of RGB wavelengths about 400 nm to about 650 nm and containing other pixels sensitive to IR or NIR wavelengths (about 700 nm to about 900 nm). System 10 in FIG. 1A (and in FIG. 1B) is similar to an embodiment described in U.S. patent application Ser. No. 11/044,996 (published as US 2005/0285966) entitled Single Chip RGB-Z sensor, assigned to Canesta, Inc., assignee herein. As described below, the configuration of FIG. 1A does not provide a common global optical filtering path for optical energy falling upon the RGB pixels and the Z pixels due to the presence of a beam splitting mechanism 70. Stated differently, optical energy falling upon RGB pixels has different wavelengths than optical energy falling upon Z pixels, because the two types of wavelengths have already been discriminated at a global level by the beam splitting mechanism 70. But as a practical matter, in some applications it may simply not be feasible to implement beam splitting.

In the beam splitting embodiment of FIG. 1A, optical energy to be detected by system 10 passes through a focusing lens 15. In the embodiment shown, RGB-Z 20 includes a first substrate 30 containing array 40 of high resolution RGB pixel detectors, and a second substrate 50 containing array 60 of lower resolution Z-pixel detectors responsive to IR or NIR wavelengths. RGB pixel array 40 outputs signals proportional to detected RGB optical energy, about 400 nm to about 650 nm. Generally IR or NIR Z-pixel array 60 is responsive to wavelengths of about 700 nm to about 900 nm. An optically selective material 70, for example a hot mirror, permits RGB optical energy to fall upon RGB array 40, while allowing IR or NIR optical energy to fall upon Z-array 60. Thus, two different optical paths are provided for optical energy exiting the beam splitting mirror mechanism 70: one path (upward in FIG. 1A) for IR-NIR wavelengths, and a second path (leftward in FIG. 1A) for RGB wavelengths. Generally if optical energy falling upon structure 70 has wavelengths exceeding perhaps 700 nm, the energy is IR-NIR and is reflected (upward in FIG. 1A) for detection by IR-NIR pixel array 50. However if optical energy falling upon material 70 has wavelength less than about 700 nm, the optical energy is RGB and passes through structure 70 for detection by RGB pixel array 30.

Detection of RGB optical energy relies upon the existence of a source of ambient light 80, the sun perhaps. Some RGB energy 90 falls upon target object 40 and is reflected into system 10 to be detected by RGB pixel sensor array 40. An RGB processor 110 processes the sensor 40 output and can cause an RGB or BW image of the target object to be present on a display. Understandably, if ambient light source 80 outputs too little or too much optical energy, RGB array 40 may not provide any meaningful information.

Detection of NIR or IR energy is a bit more complicated. Typically a modulator 130 under control of a clock system and microprocessor (not shown for ease of illustration) causes a source of NIR or IR optical energy 130 to emit period modulations. Some of this NIR or IR energy reflects off target object 40 and is detected by z-pixel array 60. A z-processor 150 (typically under control of a clock system and microprocessor, not shown) receives output signals from array 60 and derives TOF information, including z-distance data.

FIG. 1B depicts another embodiment of an imaging system 10 that also includes a beam splitting mechanism 70-1, but provides provides RGB and Z pixel detectors in a common plane, e.g., IC substrate 160. Substrate 160 includes a singe array structure 170 having regions with an array of RGB pixels 180 and regions with an array of z-pixels 190. The configuration of FIG. 1B, like that of FIG. 1A, does not provide a common global optical path for optical energy reaching RGB pixels and the Z pixels. The RGB optical system 20-1 includes a beam splitter 70-1, for example a hot mirror. In the configuration shown, hot mirror 70-1 substantially passes RGB wavelengths for detection by RGB sensor array 180, while deflecting (upward in FIG. 1B) IR-NIR components. In the IR-NIR optical system 20-2, a mirror 70-2 deflects incoming IR-NIR optical energy through an optical path equalizer 200 to Z-array 190, for detection. Other components in FIG. 1B may be substantially identical to what was described or alluded to with respect to FIG. 1A.

But the presence of beam splitting mechanism 70-1 can restrict the desired configuration of RGB and Z pixels. For example, FIG. 1C depicts an exemplary layout for single array 160, depicting R pixels, G pixels, B pixels, and Z-pixels (denoted NIR) that might not readily work with the configuration of FIG. 1B unless perhaps the RGB pixels and the z pixels were each grouped in substantially contiguous regions. Yet in some applications, it may be desired to implement an RGB-Z imaging system with precisely the sort of array shown in FIG. 1C.

Thus, there is a need in an RGB-Z imaging system to provide a global optical path. Among other advantages, such a configuration would enable great flexibility in interspersing RGB pixels and Z pixels on a common substrate, e.g., see FIG. 1C. (Note, while FIG. 1C shows IR-NIR pixels physically larger than R, G, or B pixels, such need not be the case.) As such, R pixels, G pixels, B pixels and Z pixels would all be subject to receiving optical energy with the same spectral content but for the presence of some sort of pre-pixel filter. But providing filters on a per pixel basis commonly requires using so-called dye filters (sometimes called bulk filters). But dye filters cannot readily be implemented with narrowly defined pass bands. A typical pass band for a dye filter might be about 100 nm or greater, with typically poor frequency roll-off characteristics. But the sloppy characteristics associated with bulk filters does not lend such filters to use with Z pixels, which pixels require a very narrow bandwidth, e.g., about 30 nm.

It is known in the art to fabricate narrow band filters such as interference or dichotic filters for use with optical energy of a relatively narrow bandwidth. Thus within a critical region bandwidth of 700 nm to 900 nm, an interference filter with a pass band of 800 nm to 830 nm may transmit 90% of optical energy within the pass band, while blocking perhaps 99% of optical energy whose wavelengths are beyond the filter pass band. But the specification for such filters is typically silent as to the filter performance in a non critical region, perhaps the 400 nm to 700 nm range. Filter designers do not specify such performance because the narrowband filter is typically coupled with an inexpensive wideband filter that attenuates optical energy in the non critical region of the interference filter, perhaps from 400 nm to 750 nm. By coupling both filters together, a sharp filter with a pass band of 800 nm to 830 nm and that attenuates optical energy elsewhere over the 400 nm to 900 nm range is achieved. But as the filter specification is generally silent as to transmission characteristics in the non critical 400 nm to 700 nm range, such filters typically pass optical energy in that wavelength band and are not suitable for use with systems such as shown in FIGS. 1A and 1B.

Thus there is a need for an RGB-Z imaging system that provides a global optical path. Further there is a need to provide such imaging system with preferably per pixel dye filters such that R, G, B, and Z pixels each receive substantially only the wavelengths intended to be detected by these pixels. Thus, each R, each G, each B, and each Z pixel preferably would have a dedicated dye filter. But as noted, dye filters are characterized by sloppy bandwidths. Thus, there is a need to provide a filter mechanism to ensure that optical energy presented to the Z pixels is very narrow in bandwidth, e.g., about 30 nm.

In addition to providing improved pixel filter discrimination, systems such as shown in FIGS. 1A and 1B can What is also needed is a method and system by which the relative vantage point of the system can synthetically be made to move, as though a human observer were examining the target object or scene through a movable mirror, to enhance knowledge of the target object.

The present invention provides such methods and systems to inexpensively implement RGB-Z imaging systems having a global optical path, with per pixel dye filters yet providing sharp bandwidth filtering for Z-pixels, as well as to enhance imaging by use of a synthetic mirror.

SUMMARY OF THE PRESENT INVENTION

In a first aspect, the present invention provides an RGB-Z imaging system with a global optical path, and with per-pixel dye filtering such that pixels intended to detect red, blue, or green wavelengths see essentially only those wavelengths, while Z-pixels see essentially only IR-NIR wavelengths. Since dye filtering along cannot provide a sufficiently sharp band pass for Z pixels, the present invention includes at least one interference filter having a wide pass band that readily encompasses RGB wavelengths, and a narrow, more precisely defined, band pass that passes preferably only IR-NIR wavelengths. When such interference filter is disposed in the common global optical path for all pixels, the combination of the interference filter characteristics and the dye filter characteristics results in R, G, B band pass widths that are suitable for R, G, B pixels, and results in a sharply defined narrow band pass suitable for the Z pixels. In a preferred embodiment, the R, G, B, and IR-NIR dye filters are formed using CMOS fabrication techniques directly upon the CMOS integrated circuit chip containing the RGB and Z pixels.

In a second aspect, the invention provides an RGB-Z imaging system with the visual effect of a mirror to provide a user viewing an RGB image captured by the system with a sensation of depth. Preferably as the user's head moves relative to the displayed image, objects in the captured scene move proportionally to their distance from the system. When the RGB-Z system is used in a motor vehicle, for example, the result is to provide the user with more meaningful information as to objects in near proximity to the vehicle.

Other features and advantages of the invention will appear from the following description in which the preferred embodiments have been set forth in detail, in conjunction with their accompanying drawings.

BRIEF DESCRIPTION OF THE DRAWINGS

FIGS. 5A and 5B depict, respectively, a red dye filter and its exemplary idealized transmission pass band, according to an embodiment of the present invention;

DETAILED DESCRIPTION OF THE PREFERRED EMBODIMENT

In one aspect, embodiments of the present invention provide a method and system for implementing an RGB-Z imaging system having a global optical path common to R, G, B, and Z pixels. The resultant RGB-Z imaging system preferably uses dye filters on a per-pixel basis, but sharpens the band pass for the Z (or IR-NIR) pixels by providing an interference filter in the global optical path. Preferably the dye filters are constructed using standard CMOS fabrication directly on the individual R, G, B, or Z pixels.

As noted, if problems associated with implementing a narrow band pass for IR-NIR wavelengths can be overcome, it is desirable to use dye filters in an RGB-Z imaging system that includes color RGB pixels, and NIR-IR Z-pixels. Preferably dye-type filters are provided for RGB pixels intended to respond to red, to green, or to blue wavelengths, as well as a dye-type filter for the NIR-IR spectra. For example, red, green, and blue dye filters might have respective pass bands of about 550 nm to 650 nm, about 475 nm to 575 nm, and about 400 nm to 500 nm. The dye-type IR-NIR filter has a pass band of about 700 nm to about 900 nm. These RGB dye filters and the IR-NIR dye filter are preferably presented in series with a global optical path passing though an interference (or dichrotic) filter. The interference filter has a non-critical pass band sufficiently wide to pass the RGB wavelengths, but that also has a narrow critical region band pass of about 800 nm to about 830 nm, to provide a desired narrow IR-NIR pass band. The overall result is a filtering system that provides wide pass band filtering for each color R, G, B pixel while providing effective sharply defined narrow pass band for the IR-NIR pixels in the Z-pixel array. Another aspect of the present invention provides a synthetic mirror to enhance depth sensation or perception to a viewer of a display captured by the RGB-Z system. The result enables the viewer to make more meaningful decisions based upon enhanced perception of depth.

Figures 2A, 2B:
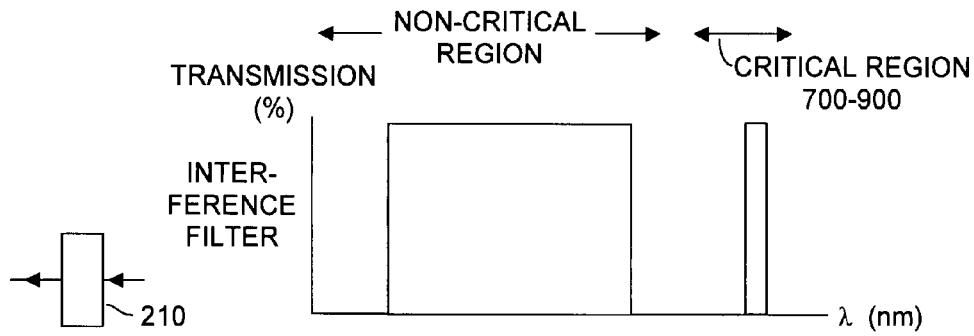
FIGS. 2A and 2B depict, respectively, an interference filter and its exemplary idealized transmission pass bands, according to an embodiment of the present invention.

The filtering aspect of the present invention will now be described. FIG. 2A depicts a generic interference filter 210, with incoming optical energy shown entering the filter on its right side, and filter optical energy exiting on the left side of the filter. FIG. 2B depicts the idealized transmission versus wavelength characteristics for this filter, according to an embodiment of the present invention. As shown by FIG. 2B, interference filter 210 is intended to provide a substantially precise narrow pass band characteristic of about 800 nm to about 830 nm in a critical region of about 700 nm to about 900 nm. In the 400 nm to 700 nm non-critical region shown, filter 210 should pass the most of the incoming optical energy, although the precise shape of the band pass in the non-critical region is relatively unimportant. As noted above, the narrow critical region pass band of filter 210 will essentially define the narrow approximately 800 nm to about 830 nm pass band for the IR-NIR pixels in Z-array 60 or 190. On the other hand, the non-critical band pass of about 400 nm to about 700 nm is sufficiently wide to permit transmission of R, G, B wavelengths through filter 210. The R, G, B wavelengths that pass through the interference filter, will be individually filtered by the dye-type red, green, and blue filters, described below.

Figures 3A, 3B:
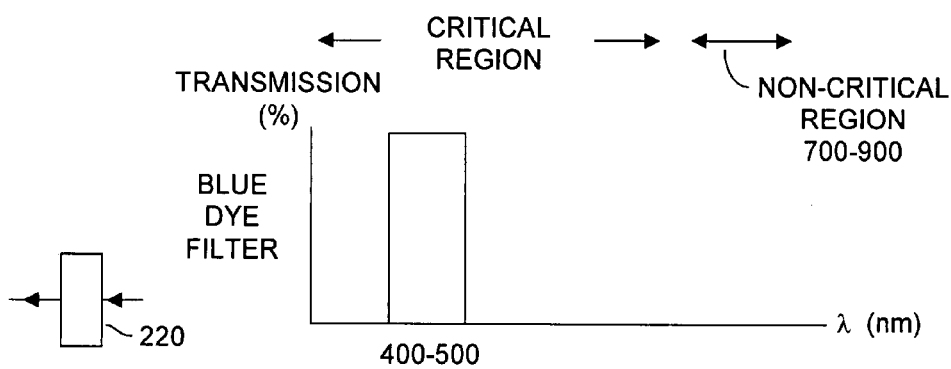
FIGS. 3A and 3B depict, respectively, a blue dye filter and its exemplary idealized transmission pass band, according to an embodiment of the present invention.
Figures 4A, 4B:
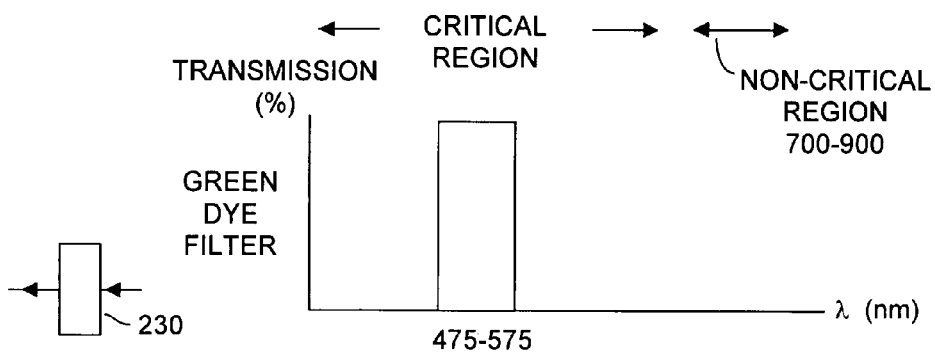
FIGS. 4A and 4B depict, respectively, a green dye filter and its exemplary idealized transmission pass band, according to an embodiment of the present invention.
Figure 5A:
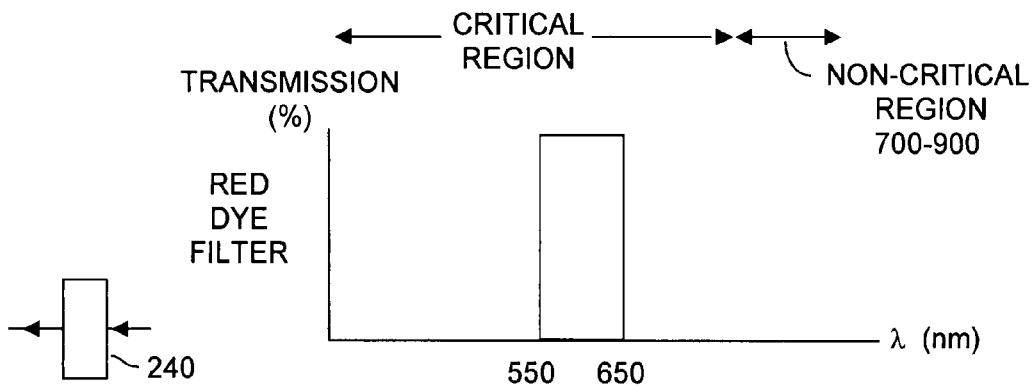

FIGS. 3A and 3B depict, respectively, a blue dye filter 220 that can be disposed above each desired blue pixel in RBG pixel in array 40 or 180, and its exemplary idealized transmission pass band, according to an embodiment of the present invention. As shown in FIG. 3B, preferably wavelengths of about 400 nm to about 500 nm are passed by filter 220, substantially unattenuated. FIGS. 4A and 4B depict, respectively, a green dye filter 230 that can be disposed above each desired green pixel in RBG pixel in array 40 or 180, and its exemplary idealized transmission pass band, according to an embodiment of the present invention. As shown by FIG. 4B, preferably filter 230 passes optical energy wavelengths of about 475 nm to about 575 nm without substantial attenuation. Similarly, FIGS. 5A and 5B depict, respectively, a red dye filter 240 that can be disposed above each desired red pixel in RBG pixel in array 40 or 180, and its idealized exemplary transmission pass band, according to an embodiment of the present invention. As shown by FIG. 5B, preferably filter 240 passes optical energy wavelengths of about 550 nm to about 650 nm without substantial attenuation. It is understood for filters 210, 220, 230, 240 that pass band shaping is relatively unimportant in the non-critical region within which preferably the filters are substantially opaque for relevant wavelengths. On the other hand, shaping of the band pass in the critical region for these filters is more important. It will be appreciated that the critical band pass regions of filters 220, 230, 240 fall within the non-critical band pass of interference filter 210. As described later herein, the intersection of the critical band pass regions for filters 220, 230, 240 with the non-critical band pass of interference filter 210 will define the effective band pass for blue, green, and red pixels in the RGB pixel array.

Figures 6A, 6B:
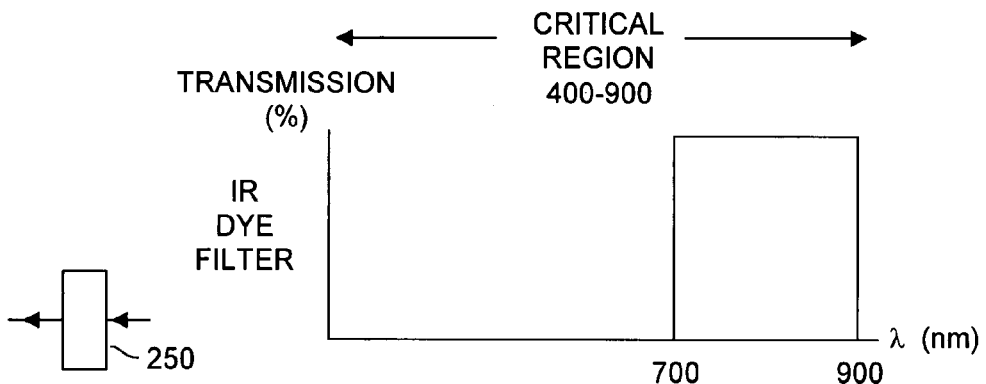
FIGS. 6A and 6B depict, respectively, an IR dye filter and its exemplary idealized transmission pass band, according to an embodiment of the present invention.

FIGS. 6A and 6B depict, respectively, an IR-NIR dye filter 250 and its exemplary idealized transmission pass band, here approximately 700 nm to 900 nm. Filter 250 substantially attenuates RGB wavelengths, while passing IR-NIR wavelengths without substantial attenuation. When coupled optically in series with interference filter 210, the net result is to produce a sharp band pass for IR-NIR frequencies. As described below, the intersection of the band pass of IR dye filter 250 with the critical region of interference filter 210 will provide a sharply defined narrow band pass for IR-NIR pixels.

Figure 7:
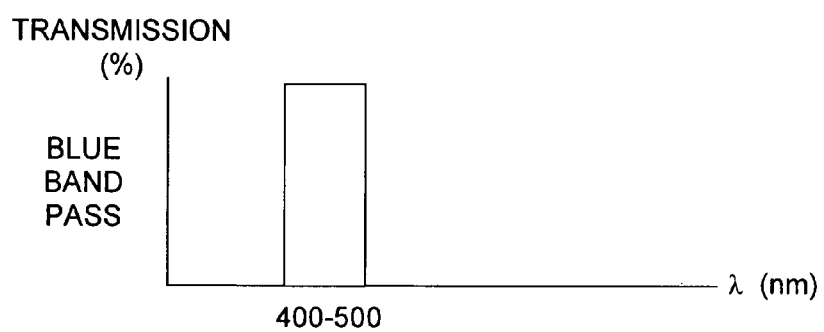
FIG. 7 depicts the resulting idealized blue pass band resulting from an optical series disposition of the interference filter of FIG. 2A and the blue dye filter of FIG. 3A, according to an embodiment of the present invention.
Figure 8:
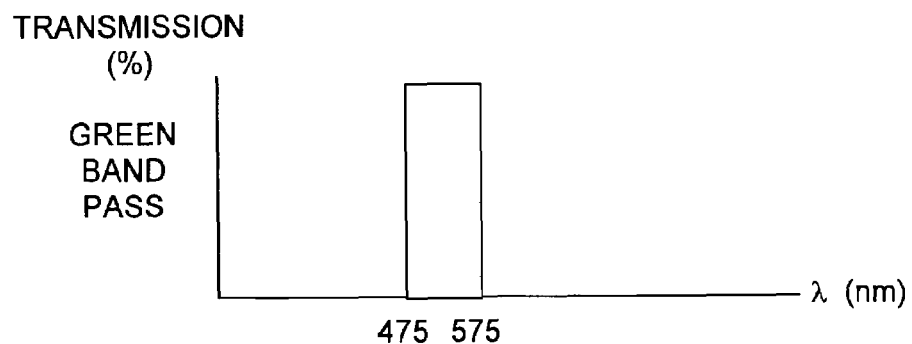
FIG. 8 depicts the resulting idealized green pass band resulting from an optical series disposition of the interference filter of FIG. 2A and the green dye filter of FIG. 4A, according to an embodiment of the present invention.
Figure 9:
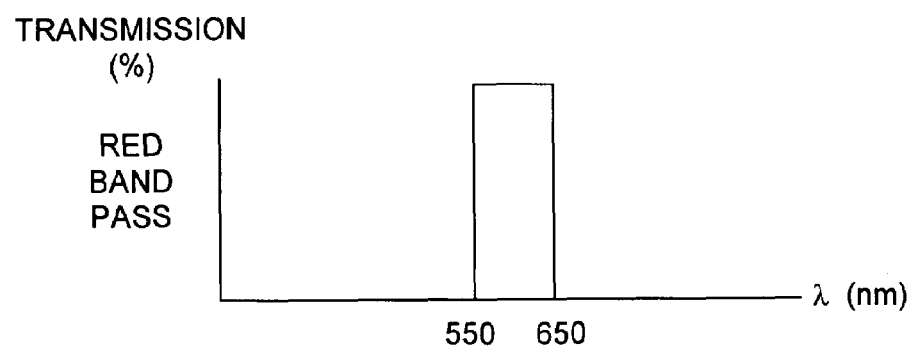
FIG. 9 depicts the resulting idealized red pass band resulting from an optical series disposition of the interference filter of FIG. 2A and the red dye filter of FIG. 5A, according to an embodiment of the present invention.
Figure 10:
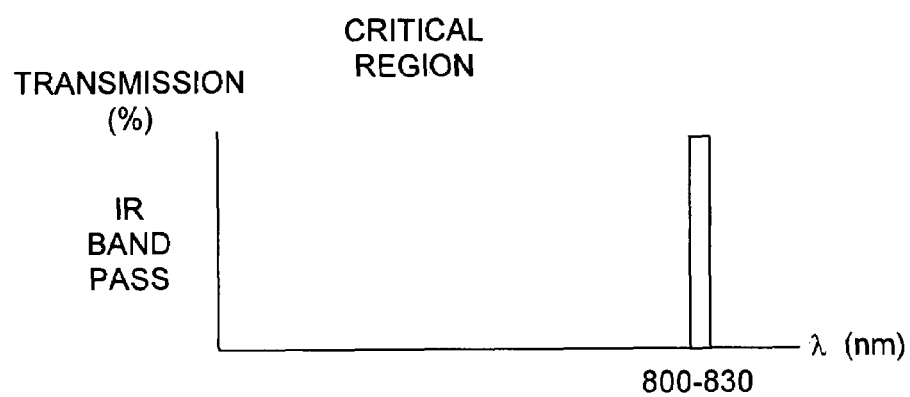
FIG. 10 depicts the resulting idealized IR-NIR pass band resulting from an optical series disposition of the interference filter of FIG. 2A and the IR-NIR dye filter of FIG. 6A, according to an embodiment of the present invention.

FIGS. 7, 8, and 9, respectively, depict the effective idealized blue, green, and red pass bands that result when interference filter 210 is disposed optically in series with blue dye filter 220, with green dye filter 230, and with red dye filter 240. Essentially the effective net pass bands represent the intersection of the pass bands of interference filter 210 and the pass bands of the respective blue, green, red dye filters 220, 230, 240. Thus the shape of the critical region pass bands of filters 220, 230, 240 will govern the resulting pass band because these critical region pass bands preferably fall within the non-critical pass band of interference filter 210, FIG. 10 depicts the resulting idealized sharply defined narrow IR-NIR pass band that results when interference filter 210 is disposed optically in series with IR-NIR dye filter 250. It is noted that the desired narrow band pass for IR-NIR is achieved, here about 800 nm to about 830 nm. The overall IR-NIR pass band characteristic represents the intersection of the pass bands of interference filter 210 and the pass band of IR dye filter 250. As such, the critical region of the IR-NIR band pass of interference filter 210 will govern the shape of the overall IR-NIR pass band.

Figure 11:
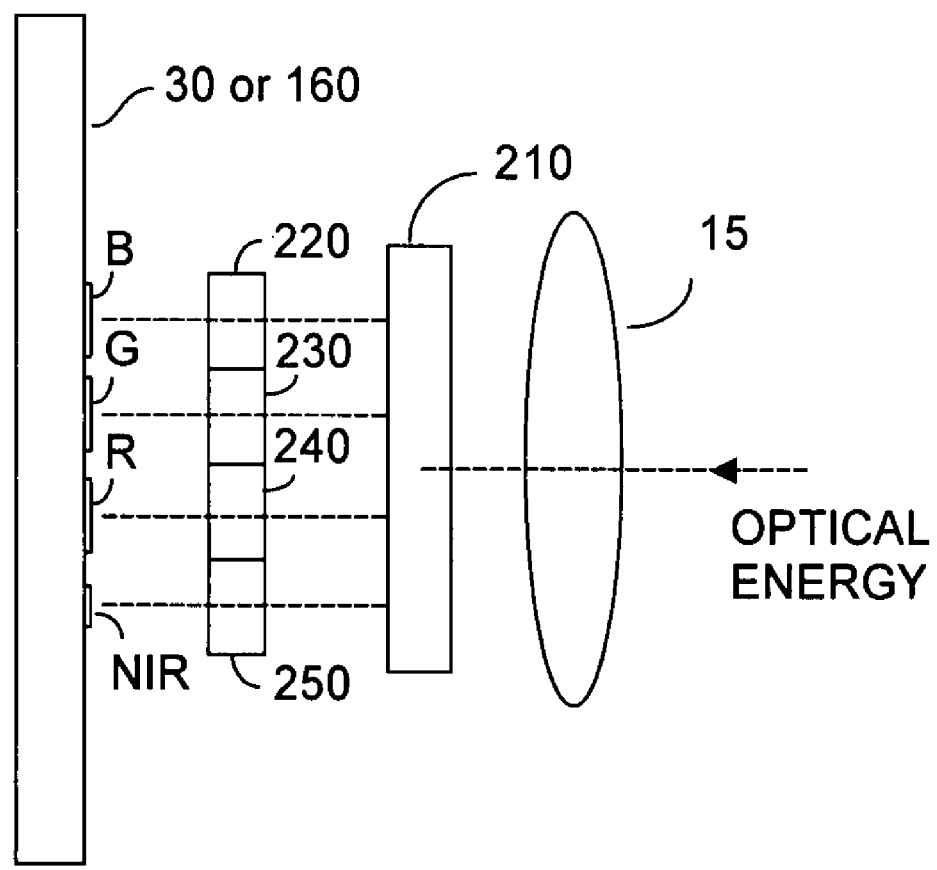
FIG. 11 depicts a portion of an imaging system with per pixel filtering, according to an embodiment of the present invention.

FIG. 11 depicts a portion of an imaging system in which there is a global optical path interference filter 210, which system provides filtering common to all pixels. Incoming optical energy, which can include RGB and Z wavelengths typically passes through a focus element, e.g., lens 15, and is presented as input to interference filter 210, such as described above with reference to FIGS. 2A and 2B. RGB wavelengths pass through the non-critical region of filter 210, while IR-NIR wavelengths pass through the narrow pass band critical region. Optical energy exiting interference filter 210 passes through individual dye filters 220, 230, 240, 250, which filters may in fact be formed directly upon respective R, G, B pixels (denoted R, G, B) and Z pixels (denoted NIR). The various RGB-Z pixels may, but need not, be formed on a common substrate such as 30 or 160. While FIG. 11 depicts but a single R, a single G, a single B, and a single Z pixel, it is understood that substrate 30 or 160 will typically contain a great many of each pixel type, arranged in a pixel array. While FIG. 11 shows different physical sizes for R, G, B pixels and for Z (IR-NIR) pixels, such need not be the case. Generally the various dye filters preferably are formed in an array that overlies the pixel array, and the various dye filters preferably are fabricated directly upon the pixel array. It will be appreciated that functionally dedicated per pixel filtering, e.g., per R, G, B, and Z pixels are thus created. As such, R pixels will be presented with substantially only wavelengths of about 550 nm to about 650 nm, G pixels will be presented with substantially only wavelengths of about 475 nm to about 575 nm, B pixels will be presented with substantially only wavelengths of about 400 nm to 500 nm, and Z or IR-NIR pixels will be presented with substantially only wavelengths of about 800 nm to about 830 nm.

In general the various dye filters 220, 230, 240, 250 are fixed by the CMOS fabrication process and are not readily changeable in their characteristics. But if it were desired to alter the characteristics of the IR-NIR filtering, e.g., if one wished to alter wavelength output of light source 140, all that is necessary is to alter the characteristics of interference filter 210. Typically interference filter 210 is not fabricated on the IC circuit chip containing the imaging system, and replacing one interference filter with another interference filter having different characteristics is readily accomplished. Thus, the present invention enables great flexibility in tailoring the IR-NIR characteristics of the RGB-Z system.

Figure 1A:
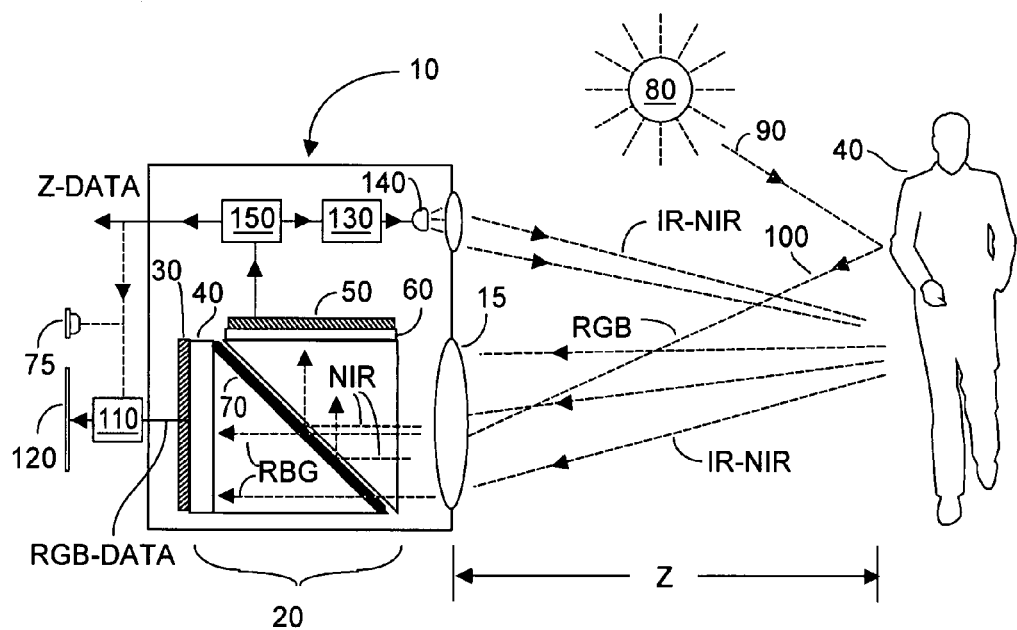
FIG. 1A is a block diagram of a dual substrate RGB-Z sensor system with dual optical paths.
Figure 1B:
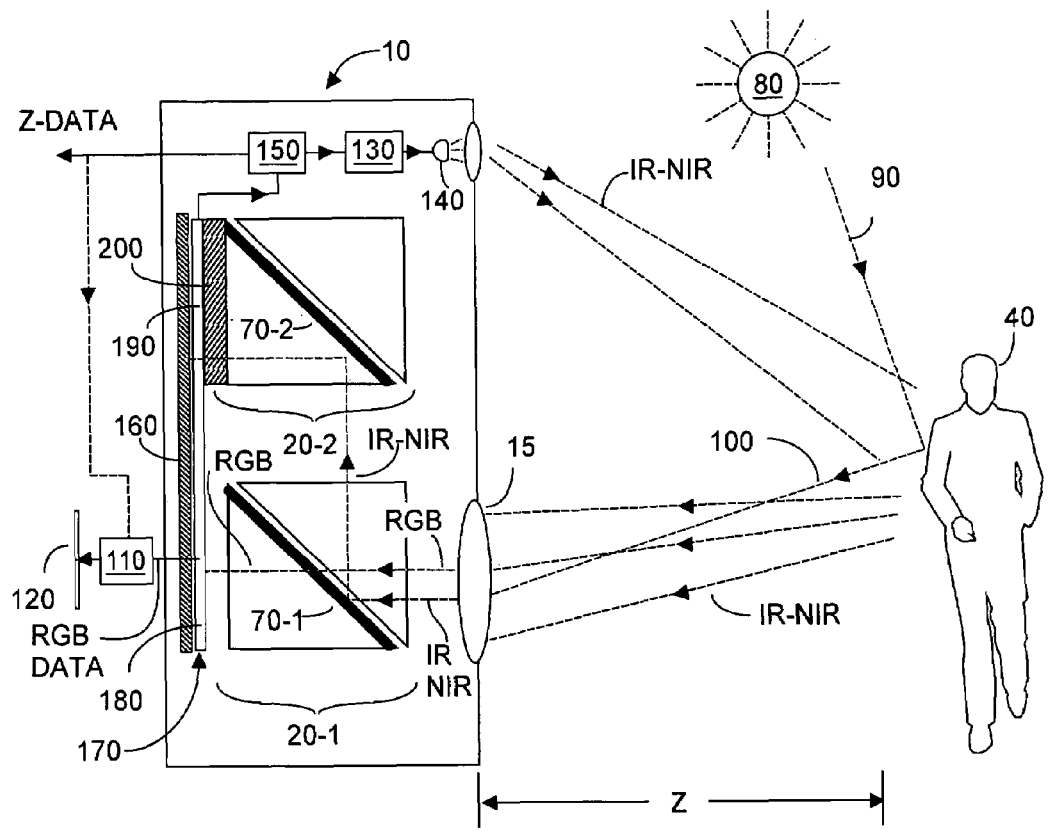
FIG. 1B is a block diagram of a single substrate RGB-Z sensor system with dual optical paths.
Figure 1C:
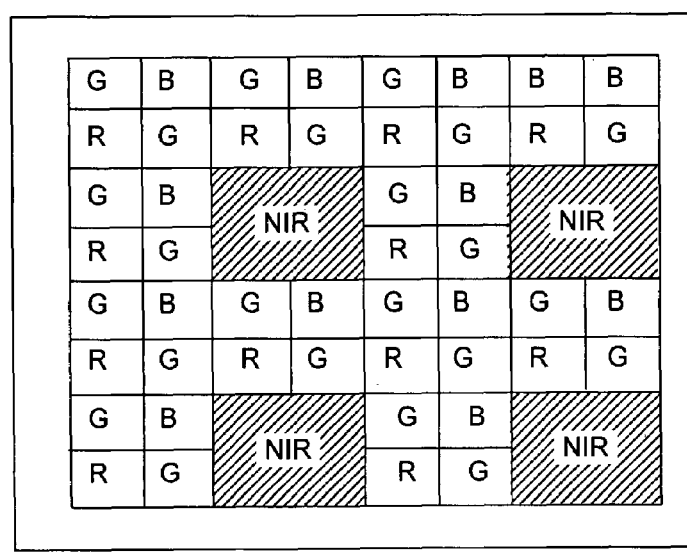
FIG. 1C is a plan view of composite RGB-Z sensor array as might be desirable to use in an RGB-Z sensor system, according to the present invention.
Figure 12:
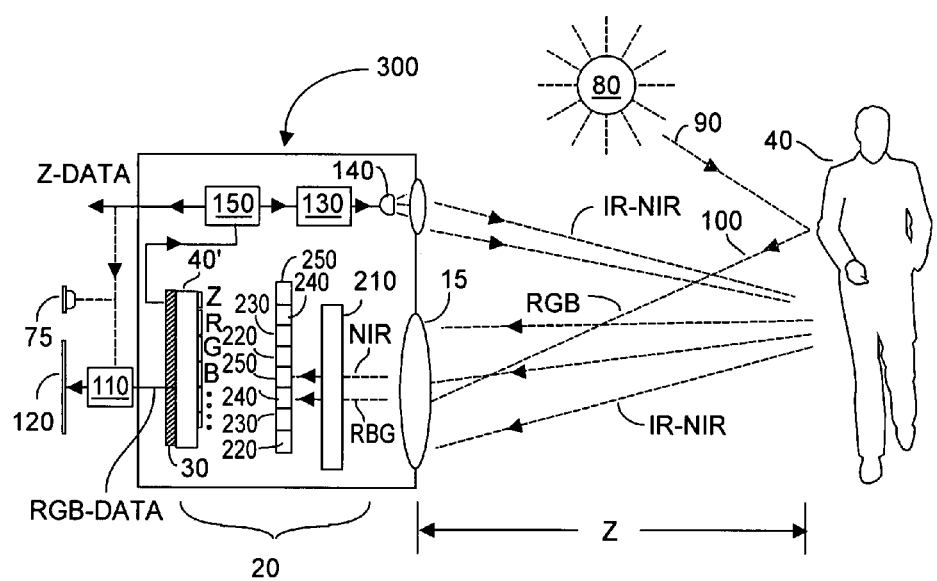
FIG. 12 depicts an overall imaging system including per pixel filtering, according to an embodiment of the present invention.

FIG. 12 depicts an imaging system 300 that is provided with a filtering system according to the present invention. Elements in FIG. 12 that are similarly numbered to elements in FIG. 1A or FIG. 1B may be similar if not identical. In FIG. 12, incoming RGB and Z optical energy passes through lens 15 and is presented as input to interference or dichroic filter 210. If desired, interference filter 210 could be disposed before rather than after lens 15. It will be appreciated that interference filter 210 is in a global optical path common to all pixels, e.g., R, G, B, and Z (IR-NIR) pixels. Optical energy exiting interference filter 210 will be roughly RGB wavelengths in the about 400 nm to about 700 nm range, and will be fairly precisely IR-NIR wavelengths in the 800 nm to 830 nm range. This exiting optical energy is presented to an array of dye filters 220, 230, 240, 250, as described earlier herein. RGB optical energy exiting the various dye filters will be limited in wavelength by the characteristics of respective dye filter 240, 230, 220. As noted, IR-NIR dye filter 250 may have relatively loose pass band characteristics because the critical region of interference filter 210 will sharply define a narrow pass band in the IR-NIR region, e.g., about 800 nm to about 830 nm. Although system 300 is shown with RGB and Z pixels formed in an array 40' on a common substrate 30, one could of course use more than one substrate.

It will be appreciated that system 300 provides the benefits sought for the first aspect of the present invention: an RGB-Z system having a global optical path, and using dye filters to enable, if desired, per pixel filtering for R, G, B pixels and sharp filtering for Z (IR-NIR) pixels, which R, G, B, Z pixels may be fabricated on a common substrate. As noted, the various dye filters may be fabricated directly upon the individual pixels.

Referring now to FIGS. 13A-13D, the second aspect of the present invention provides an imaging system with an acquisition system 400. In real life experience, a user viewing a scene can acquire depth information by moving about relative to the scene, e.g., by varying the user's vantage point. For example at one vantage point, two objects, a tree and a pylori perhaps, may appear side-by-side, whereas from another vantage point, the two objects might line up. A user can also acquire depth information by looking at a mirror that reflects the scene, and then changing vantage point relative to the mirror. For example objects closer to the viewer in the scene will move faster than farther away objects, as the user's viewpoint changes. However if the user were to view a flat screen RGB display of the scene, the ability to acquire depth information by changing the user's vantage point is lost. This is true because in the RGB the relative location of rendered objects in the scene does not change as the user's viewpoint changes. In some motor vehicle applications it is desirable to provide the operator of the vehicle with a display of objects near the vehicle. For example, when backing-up, some vehicles provide an RGB image for the driver to look at, showing what is behind the moving vehicle. However images acquired by a conventional RGB camera system and displayed on an RGB display cannot always provide an adequate sense of depth information for the vehicle operator.

Figure 13A:
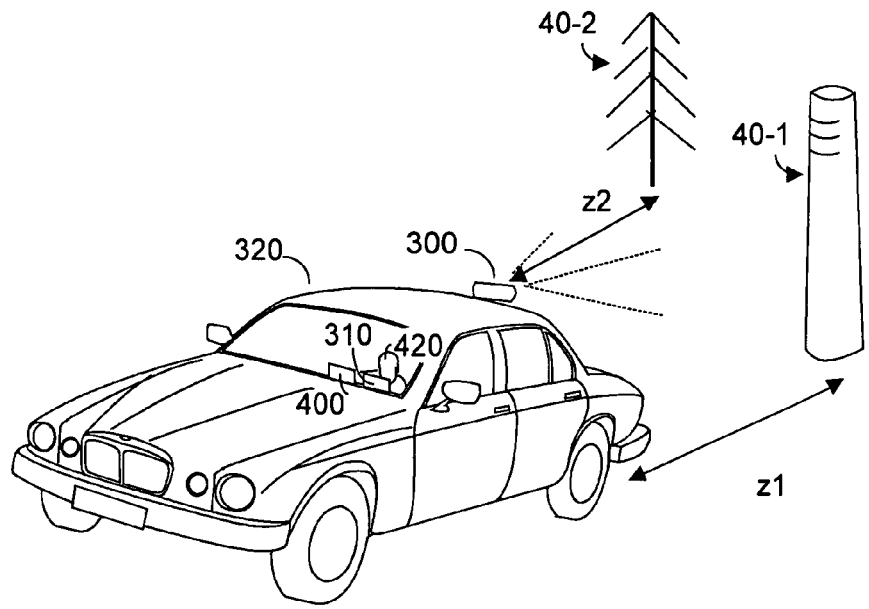
FIG. 13A depicts a synthetic mirror imaging system in a motor vehicle application, according to an embodiment of the present invention.

FIG. 13A depicts the synthetic mirror aspect of the present invention 400 disposed in a motor vehicle 320 to assist the vehicle operator 420 in sensing objects such as 40-1, 40-2 in proximity to the vehicle. In the embodiment shown, operator 420 can view an RGB display 310 to see a rendering 125 (see FIGS. 13B, 13C) of target objects 40-1, 40-2. Nomenclature Xo,Yo,Zo denotes position of the head of operator 420, while X1,Y1,Z1, and X2,Y2,Z2 denote position of target objects 40-1, 40-2 respectively. Given that the coordinates of all the objects in the acquired scene are known, e.g., objects 40-1, 40-2, computer 430 can calculate the rendered scene from different vantage points as the operator's head is moved. Mathematical approaches for computing new vantage point images are known in the art and thus are not described herein.

Figure 13B:
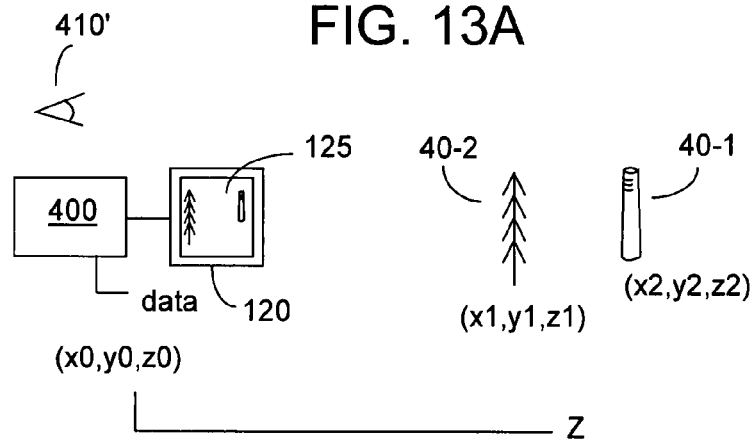
FIGS. 13B and 13C depict RGB displays of different rendered scenes acquired by the system of FIG. 13A, according to an embodiment of the present invention.
Figure 13C:
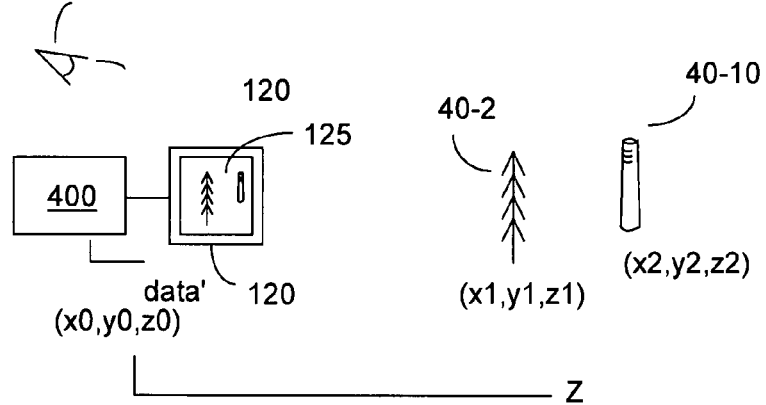
Figure 13D:
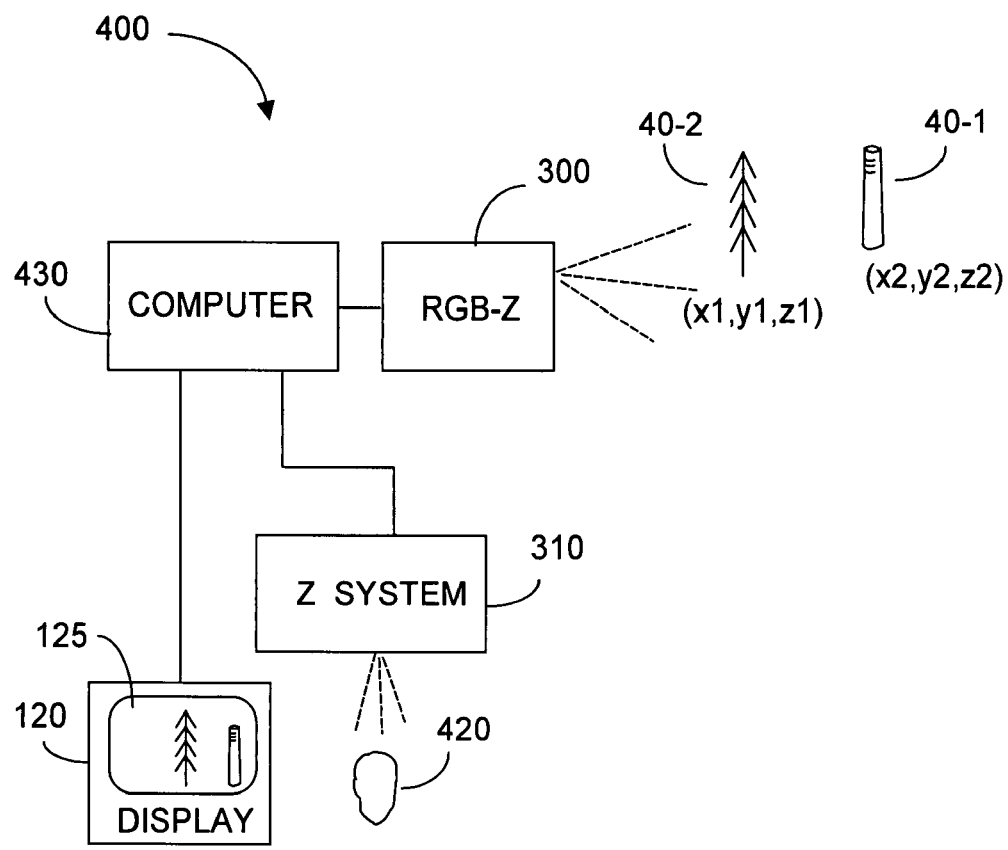
FIG. 13D is a block diagram showing an exemplary embodiment of the synthetic mirror imaging aspect of the present invention.

As shown in FIG. 13D, synthetic mirror imaging system 400 includes an RGB-Z system 300, for example a system such as described with reference to FIG. 12 that, in the application at hand, acquires images of objects behind vehicle 320. System 400 also includes a three-dimensional acquisition system 310, perhaps a Z-system that acquires coordinate information about the head of operator 420. Such systems are known in the art and are described in many patents issued to Canesta, Inc., assignee herein.

In FIGS. 13A-13D, as the operator's head moves, the information acquired by system 310 changes. Output from system 310 and output from RGB-Z system 300 is coupled to a computer system 430 that processes the information. Computer system 430 uses the information to provide and update rendered images 125 that are displayed on a preferably RGB monitor 120 for viewing by operator 420.

As operator 420 moves his or her head when viewing rendered image 125, the data acquired by system 310 enables computer 430 to update the rendered image properly to provide a better sense of three-dimensional distances of objects rendered on the RGB display. Such information is shown generically in FIGS. 13B and 13C by data, data'. Because RGB-Z system 300 acquires distances Z to target objects 40-1, 40-2, the updated rendered image will show displacement of the target objects as the operator's view point changes responsive to operator head movement. For example if tree 40-2 is closer to system 300 than is pylori 40-1, e.g., Z2<Z1, then as the operator's head moves relative to display 120, position of nearby tree 40-2 will change at greater velocity than will position of more distant pylori 40-1. Comparing the rendered images in FIGS. 13B and 13C, the displayed (x,y,z) locations of the two objects will thus change at different velocities. As a result, the operator viewing RGB display 125 can acquire a truer sense of what objects are behind vehicle 320, and approximately where such objects are positioned relative to the vehicle.

In one embodiment, display 125 preferably also shows reference markings, e.g., grid lines, that are not physically present in the scene being imaged. Such grid lines can represent known distances from the rear of the vehicle, e.g., 1 M, and will move responsive to operator head movement, just like physical objects. The inclusion of such reference markings further assists the vehicle operator in better appreciating distances associated with imaged target objects. Since the distance from the operator's head to system 310 is relatively constant and small, this distance can be approximated as being fixed such that an ordinary RGB camera can be used for system 310.

The sense of Z distance provided by RGB display 125 is more meaningful to operator 420 than would be an ordinary RGB image not rendered with a synthetic mirror according to the second aspect of the present invention. The display thus mimics what the operator might observe though a mirror that captures the scene and target objects.

Comparing FIGS. 13A and 13B, three-dimensional data (denoted data, data') output by the present invention, and the nature of the rendered scene 125 change with virtual movement of a viewer's viewing position 410. The enhanced three-dimensional (x,y,z) information obtained and viewed is as if the viewer looked at the actual scene in a mirror that could be moved relative to the viewer's (x0,y0,z0) location Modifications and variations may be made to the disclosed embodiments without departing from the subject and spirit of the invention as defined by the following claims.

What is claimed is:

1. For use in a sensor system having a first plurality of detectors responsive to a broad first range of wavelengths dividable into at least a first sub-range and a second sub-range, and having a second plurality of detectors responsive to a narrower second range of longer wavelengths, said first plurality of detectors and said second plurality of detectors sharing a common optical path, a method of filtering incoming optical energy falling upon said sensor system comprising:

(a) inputting said incoming optical energy to an interference filter disposed in said common optical path, said interference filter having a broad first pass band passing at least said first range of wavelengths, and having a more sharply defined second pass band that defines said second narrower range of longer wavelengths;

(b) subjecting optical energy exiting said interference filter as input to at least a first dye filter having a band pass defining said first sub-range, and as input to a second dye filter having a band pass defining said second sub-range, and as input to a third dye filter having a band pass encompassing said sharply defined second pass band;

said first dye filter disposed above at least one detector in said first plurality of detectors responsive to said first sub-range, said second dye filter disposed above at least one detector in said first plurality of detectors responsive to said second sub-range, and said third dye filter disposed above at least one detector in said second plurality of detectors;

wherein detectors in said first sub-range, detectors in said second sub-range, and detectors in said second range of longer wavelengths each receive optical energy having wavelengths defined by an intersection of a band pass of a respective dye filter and a band pass of said interference filter.

2. The method of claim 1, wherein said sensor system is an RGB-Z system, and:

step (b) further includes subjecting optical energy exiting said interference filter as input to a fourth dye filter having a band pass defining a third sub-range, said third sub-range being within said broad first pass band of said interference filter;

said fourth dye filter is disposed above at least one detector in said first plurality of detectors responsive to said fourth sub-range;

wherein detectors in said third sub-range receive optical energy having wavelengths defined by an intersection of a band pass of said fourth dye filter and a band pass of said interference filter.

3. The method of claim 1, wherein said first sub-range and said second sub-range are identical such that said sensor system responds solely to gray scale.

4. The method of claim 1, wherein said broad first pass band of said interference filter passes wavelengths from about 400 nm to about 700 nm.

5. The method of claim 1, wherein said more sharply defined second pass band of said interference filter passes wavelengths from about 800 nm to about 830 nm.

6. The method of claim 1, wherein said first sub-range passes wavelength selected from a range consisting of (i) blue spectra, (ii) green spectra, (iii) red spectra, (iv) 400 nm to about 500 nm, (v) about 475 nm to about 575 nm, and (vi) about 550 nm to about 650 nm.

7. The method of claim 1, wherein said third dye filter passes wavelengths selected from a group consisting of (i) IR wavelengths, (ii) NIR wavelengths, and (iii) wavelengths in a range of about 700 nm to about 900 nm.

8. The method of claim 1, wherein at least one of said first dye filter, said second dye filter, and said third dye filter are fabricated directly upon an integrated circuit array containing at least one of said first plurality of detectors and said second plurality of detectors.

9. For use in a sensor system having a first plurality of detectors responsive to a broad first range of wavelengths dividable into at least a first sub-range and a second sub-range, and having a second plurality of detectors responsive to a narrower second range of longer wavelengths, said first plurality of detectors and said second plurality of detectors sharing a common optical path, a filter system to filter incoming optical energy falling upon said sensor system, said filter system comprising:

an interference filter disposed in said common optical path so as to receive as input incoming optical energy falling upon said filter system, said interference filter having a broad first pass band passing at least said first range of wavelengths, and having a more sharply defined second pass band that defines said second narrower range of longer wavelengths;

at least a first dye filter having a band pass defining said first sub-range;

at least a second dye filter having a band pass defining said second sub-range; and a third dye filter having a band pass encompassing said sharply defined second pass band;

said first, said second, and said third dye filter disposed so as to receive as input optical energy exiting said interference filter such that said first dye filter is disposed above at least one detector in said first plurality of detectors responsive to said first sub-range, said second dye filter is disposed above at least one detector in said first plurality of detectors responsive to said second sub-range, and said third dye filter disposed above at least one detector in said second plurality of detectors;

wherein detectors in said first sub-range, detectors in said second sub-range, and detectors in said second range of longer wavelengths each receive optical energy having wavelengths defined by an intersection of a band pass of a respective dye filter and a band pass of said interference filter.

10. The filter system of claim 9, further including:

a fourth dye filter, having a band pass defining a third sub-range falling within said broad first pass band of said interference filter, disposed so as to receive as input optical energy exiting said interference filter and disposed above at least one detector in said first plurality of detectors responsive to said third sub-range;

wherein detectors in said third sub-range receive optical energy having wavelengths defined by an intersection of a band pass of said fourth dye filter and a band pass of said interference filter.

11. The filter system of claim 9, wherein said first sub-range and said second sub-range are equal such that said sensor system responds to gray scale.

12. The filter system of claim 9, wherein said broad first pass band of said interference filter passes wavelengths from about 400 nm to about 700 nm.

13. The filter system of claim 9, wherein said more sharply defined second pass band of said interference filter passes wavelengths from about 800 nm to about 830 nm.

14. The filter system of claim 9, wherein said first sub-range passes wavelength selected from a range consisting of (i) blue spectra, (ii) green spectra, (iii) red spectra, (iv) 400 nm to about 500 nm, (v) about 475 nm to about 575 nm, and (vi) about 550 nm to about 650 nm.

15. The filter system of claim 9, wherein said third dye filter passes wavelengths selected from a group consisting of (i) IR wavelengths, (ii) NIR wavelengths, and (iii) wavelengths in a range of about 700 nm to about 900 nm.

16. The filter system of claim 9, wherein at least one of said first dye filter, said second dye filter, and said third dye filter are fabricated directly upon an integrated circuit array containing at least one of said first plurality of detectors and said second plurality of detectors.

17. The filter system of claim 10, wherein said sensor system is an RGB-system.

18. For use with an RGB-Z system that renders an image of a scene for viewing by a user, a method of dynamically displaying a rendering of said screen responsive to movement of the head of a user viewing said image, the method including the following steps:

(a) acquiring RGB-Z of target objects in said scene
(b) acquiring positional information as to location of a head of said user, where said location defines a user vantage point;
(c) dynamically updating renderings of said image using data acquired at step (a) and step (b) such that positional change of said target objects in said display are such that target objects farther from said user vantage point move more slowly than target objects closer to said user vantage point;

wherein said user viewing a display of said scene acquires a measure of depth associated with said target objects;

wherein an updated said display reflects said scene from a new vantage point of said user.

19. The method of claim 18, wherein said RGB-Z system is employed in a motor vehicle, and further including (d) displaying a rendering of a reference image.

20. The method of claim 18, wherein at least two of steps (a), (b) and (c) are carried out under command of a computer.

* * * * *